(12) United States Patent
Shinohara et al.

(10) Patent No.: US 7,804,794 B2
(45) Date of Patent: Sep. 28, 2010

(54) POWER-SAVING NETWORK SWITCHING DEVICE

(75) Inventors: Masayuki Shinohara, Kawasaki (JP); Nobuhito Matsuyama, Hadano (JP); Takayuki Muranaka, Kawasaki (JP); Isao Kimura, Yokohama (JP); Shinichi Akahane, Hachioji (JP)

(73) Assignee: ALAXALA Networks Corporation, Kanagawa (JP)

( * ) Notice: Subject to any disclaimer, the term of this patent is extended or adjusted under 35 U.S.C. 154(b) by 889 days.

(21) Appl. No.: 11/487,990

(22) Filed: Jul. 18, 2006

(65) Prior Publication Data
US 2007/0201461 A1 Aug. 30, 2007

(30) Foreign Application Priority Data
Feb. 27, 2006 (JP) .............................. 2006-049960

(51) Int. Cl.
G08C 17/00 (2006.01)
H04L 12/28 (2006.01)
H04L 12/56 (2006.01)
H04B 1/04 (2006.01)
H04B 1/38 (2006.01)

(52) U.S. Cl. .................... 370/311; 370/401; 455/127.5; 455/522; 455/574

(58) Field of Classification Search .................. 370/311, 370/401; 455/127.5, 522, 574
See application file for complete search history.

(56) References Cited

U.S. PATENT DOCUMENTS

| 6,850,754 | B2 * | 2/2005 | Nakano | 455/348 |
| 7,408,961 | B2 * | 8/2008 | Kaku | 370/535 |
| 2004/0053643 | A1 * | 3/2004 | Kimura | 455/558 |
| 2004/0160898 | A1 | 8/2004 | Lim et al. | |
| 2004/0218634 | A1 | 11/2004 | Peng et al. | |
| 2007/0264962 | A1 * | 11/2007 | Ueno et al. | 455/343.2 |

FOREIGN PATENT DOCUMENTS

| CN | 101167373 | 4/2008 |
| JP | 2000-201166 | 7/2000 |
| JP | 2005-123715 | 5/2005 |
| WO | WO 2006/111787 | 10/2006 |

* cited by examiner

*Primary Examiner*—Ayaz R Sheikh
*Assistant Examiner*—Blanche Wong
(74) *Attorney, Agent, or Firm*—Antonelli, Terry, Stout & Kraus, LLP.

(57) ABSTRACT

A network switching device includes packet switching means and clock signal providing means. The packet switching means receive packets sent from any of the plurality of lines, determines forwarding destinations for the received packets, and forwards the received packets. The packet switching means operates synchronized with a provided clock signal. The clock signal providing means provides the clock signal to the packet switching means. The clock signal providing means is capable of switching a frequency of at least a portion of the clock signal for being provided to the packet switching means to multiple different values.

18 Claims, 12 Drawing Sheets

Fig.4

| | | 17 |
|---|---|---|
| RUNNING MODE | NORMAL POWER FIXED RUNNING MODE | OFF |
| | LOW-POWER FIXED RUNNING MODE | ON |
| | TRAFFIC LOAD BASIS RUNNING MODE | OFF |
| | PERIODIC BASIS RUNNING MODE | OFF |
| | LINE SPEED BASIS RUNNING MODE | OFF |
| TRAFFIC LOAD BASIS SETTINGS | LESS THAN M (packets/sec) | LOW-FREQUENCY CLOCK OPERATION |
| | M OR GREATER | HIGH-FREQUENCY CLOCK OPERATION |
| PERIODIC BASIS SETTINGS | TIME T1 THROUGH TIME T2 | LOW-FREQUENCY CLOCK OPERATION |
| | TIME T2 THROUGH TIME T1 | HIGH-FREQUENCY CLOCK OPERATION |
| LINE SPEED BASIS SETTINGS | LESS THAN N (Mbps) | LOW-FREQUENCY CLOCK OPERATION |
| | N OR GREATER | HIGH-FREQUENCY CLOCK OPERATION |
| NON-USE RECORDS | INTERFACE BOARD | #3 |
| | PHYSICAL INTERFACE BLOCK | #2-2    #2-3 |

POWER-SAVING NETWORK SWITCHING DEVICE

CROSS REFERENCE TO RELATED APPLICATIONS

This application relates to and claims priority from Japanese Patent Applications No. 2006-049960, filed on Feb. 27, 2006, the entire disclosure of which is incorporated by reference.

BACKGROUND

1. Technical Field

The present invention relates to network switching devices, and in particular to reducing power consumption in network switching devices.

2. Description of the Related Art

A network switching device, including a switch and a router, is a critical device in a network system. In recent years there have been remarkable increases in performance and capacity of the network switching device accompanying an increase in data traffic sent through the network and accompanying an increase in size of the network. On the other hand, accompanying the increased performance and the increased capacity there has also been a tendency for increased power consumption in the network switching device as well, and controlling power consumption of the network switching device has become an issue from both the perspective of system operating costs and environmental protection.

Technologies that provide a normal mode and a low-power mode in devices that are connected together through a cable are known.

In the aforementioned related technologies, however, no consideration has been given to saving of power in the network switching device. Typically, means wherein the packet processing capability per unit time is increased through increasing the level of integration/processor clock frequency of the semiconductor integrated circuits included in the device are used in order to increase the performance of the network switching device (for example, the switching capacity). However, the amount of power consumed in the semiconductor integrated circuits increases concomitant with the increase in the level of integration and the operating clock frequency. In conventional network switching devices, low-power consumption has been achieved through designing semiconductor integrated circuits with reduced performance or functionality. However, this approach runs the risk of being unable to fulfill both power-saving requirement and performance requirement.

SUMMARY

An advantage of some aspects of the invention is to reduce the amount of power consumption while maintaining the required performance, when required, in a network switching device.

A first aspect of the present invention provides a network switching device. The network switching device pertaining to the first aspect of the invention comprises at least one interface block, at least one switching block, and a mode management block. The at least one interface block is connected respectively to at least one line and receive packet with associated destination-address information and send packet to a forwarding destination. The at least one interface block is capable of changing operation to operation modes with different levels of power consumption. The at least one switching block determines the forwarding destination of the received packet based on the destination-address information associated with the received packets. The at least one switching block is capable of changing operation to operation modes with different levels of power consumption. The mode management block is capable of managing the operation modes of the at least one interface block and the operation modes of the at least one switching block independently.

The network switching device pertaining to the first aspect can switch the switching block and the interface block each to operation modes with different levels of power consumption, making it possible to change the operation modes each independently. This makes it possible to both improve the performance of the network switching device by increasing the power consumption level, and possible to decrease the power consumption level of the network switching device by decreasing the power consumption level, making it possible to make changes flexibly. The result is that it is possible to control the amount of power consumed, while yet maintaining the required performance when the performance is required in the network switching device.

A second aspect of the present invention provides a network switching device connected to a plurality of lines. The network switching device pertaining to the second aspect of the invention comprises a packet switching means and a clock signal providing means. The packet switching means is for receiving packets sent from any of the plurality of lines, for determining forwarding destinations for the received packets, and for forwarding the received packets. The packet switching means operates synchronized with a provided clock signal. The clock signal providing means is for providing the clock signal to the packet switching means. The clock signal providing means is capable of switching a frequency of at least a portion of the clock signal for being provided to the packet switching means to multiple different values.

The network switching device pertaining to the second aspect of the invention can change to different values the frequency of at least a portion of the clock signal for being provided to the packet switching means. The frequency being high makes it possible to increase the performance of the network switching device by increasing the processing speed of the packet switching means, which operates synchronized with this clock signal. If the frequency is low, this makes it possible to reduce the power consumption of the network switching device by reducing the processing speed of the packet switching means. The result is that it is possible to control the amount of power consumption while maintaining the required performance, when the performance is required, in the network switching device.

The above and other objects, characterizing features, aspects and advantages of the invention will be clear from the description of preferred embodiments presented below along with the attached figures.

BRIEF DESCRIPTION OF THE DRAWINGS

FIG. 4 shows an explanatory diagram of one part of the contents of a settings file;

DETAILED DESCRIPTION OF THE PREFERRED EMBODIMENTS

Embodiments of the present invention will be described below with reference to the drawings.

A. Embodiment

Structure of Network Switching Device

Figure 1:
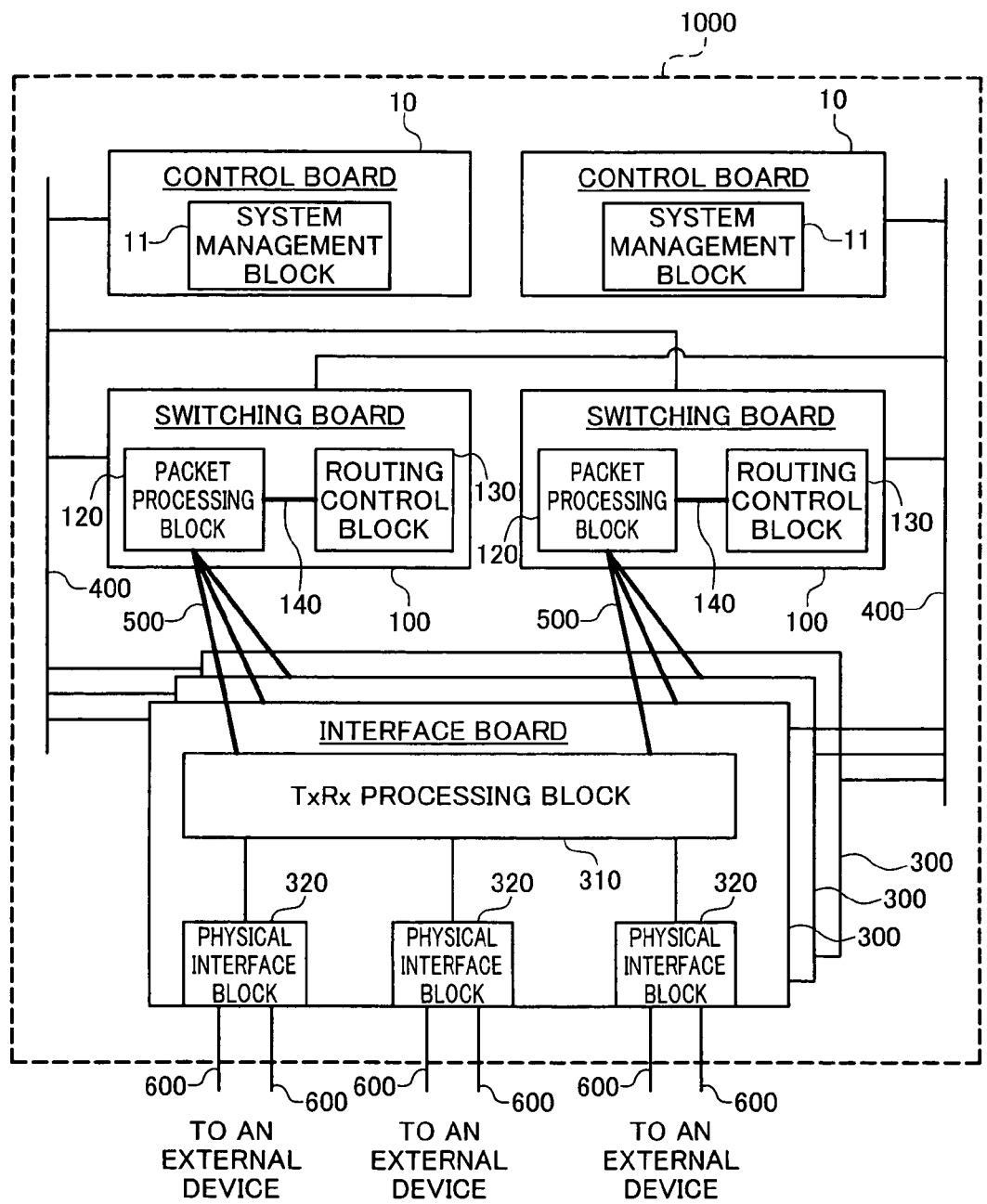
FIG. 1 shows a block diagram of the basic structure of a network device pertaining to an embodiment.
Figure 2:
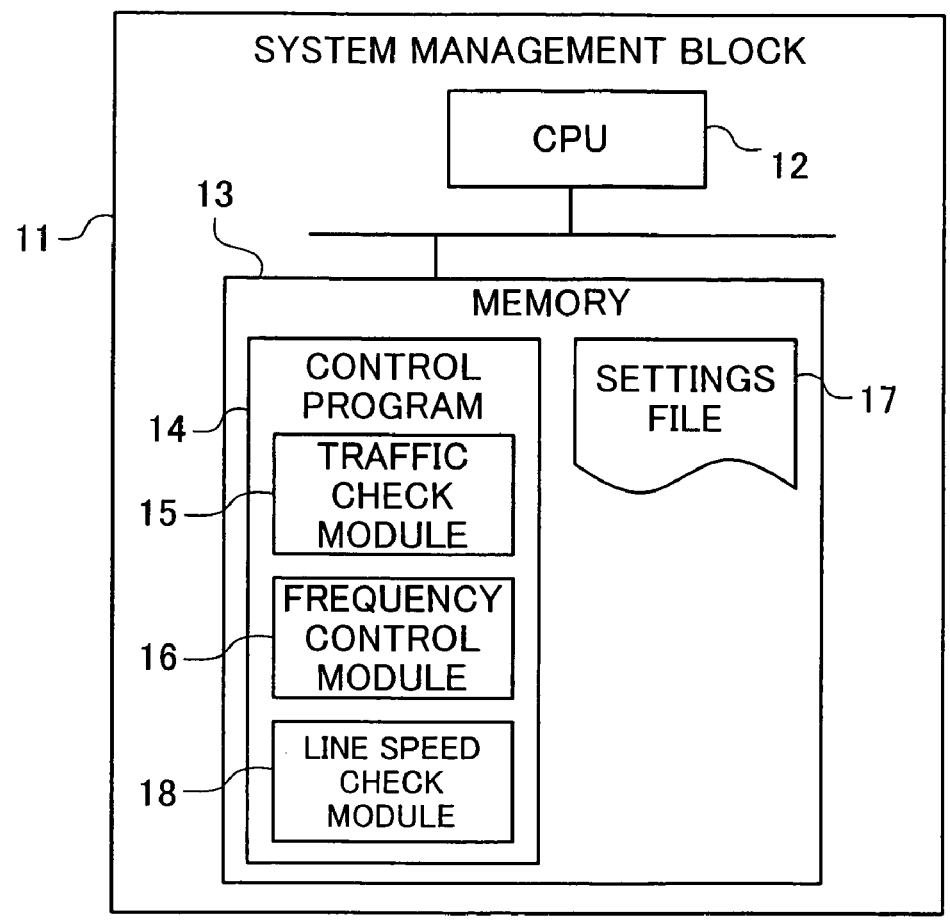
FIG. 2 shows a block diagram of the internal structure of the system management block.
Figure 3:
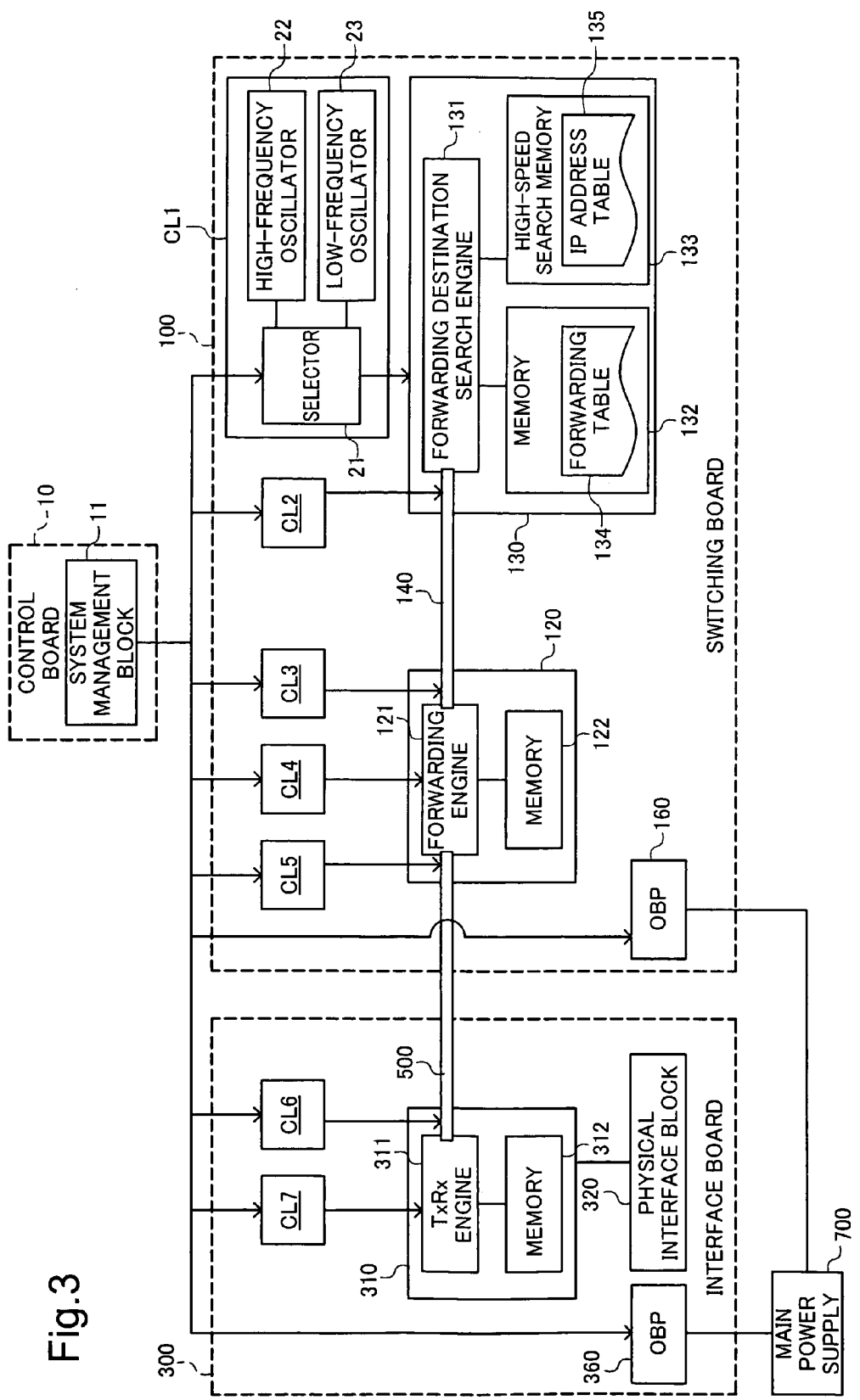
FIG. 3 shows a block diagram of the structure focusing on an interface board and a switching board.

The structure of a network switching device according to the embodiment will be explained in reference to FIG. 1 through FIG. 3. FIG. 1 shows a block diagram illustrating the basic structure of a network device pertaining to the embodiment. FIG. 2 shows a block diagram of the internal structure of a system management block. FIG. 3 shows a block diagram of the structure focusing on an interface board and a switching board.

As is shown in FIG. 1, the network switching device 1000 pertaining to the embodiment includes, primarily, a control board 10, a switching board 100, and an interface board 300. The control board 10 includes a system management block 11. The control board 10 is connected, so as to be able to communicate, through a control bus 400 to the switching board 100 and the interface board 300. The system management block 11 of the control board 10 sends control signals to each of the constituent elements of the interface board 300 and the switching board 100, and receives various type of information from each of these elements, through the control bus 400. In FIG. 1, two control boards 10 are provided in order to improve reliability through redundancy, where one is a active control board that is used at normal times, and the other is a standby control board that is used when a failure occurs in the active control board.

The system management block 11 is a controller for controlling the network switch 1000 as a whole. As shown in FIG. 2, the system management block 11 includes a central processing unit (CPU) 12 and a memory 13. The memory 13 stores a control program 14 and a settings file 17. The CPU 12 executes the control program 14 to produce the functions of the system management block. The control program 14 includes a variety of modules, such as modules that perform process relate to routing protocol such as RIP (routing information protocol) or OSPF (open shortest path first), etc., but only those structures required for describing the embodiment have been selected for inclusion in the figure, and the detailed description of the invention describes the structures that are shown. The control program 14 includes a traffic check module 15, a frequency control module 16, and a line speed check module 18. The traffic check module 15 communicates with the switching board 100 to receive the traffic load for the packets that are processed by the switching board 100. A frequency control module 16 controls the setting/changing of the operating frequency (the clock signal frequency) of the various types of buses (explained below) and circuits included in the switching board 100 and the interface board 300. For example, in the startup process described below, the operating frequency is set depending on the operation mode. The line speed check module 18 checks the line speed of each line 600 that are connected to the respective physical interface blocks 320. The processes performed by these modules will be described in greater detail below.

In the embodiment, the network switching device 1000 includes two switching boards 100. The two switching boards 100 each have identical structures, and in FIG. 1, identical constituent elements are given identical codes. Each switching board 100 includes a packet processing block 120, and a routing control block 130. The packet processing block 120 is connected by an internal bus 140 so as to be able to communicate with the routing control block 130. The packet processing block 120 and the routing control block 130 are application specific integrated circuits (ASIC), designed so as to produce the functions of these circuits described below.

In the embodiment, the network switching device 1000 includes three interface boards 300. Each of the three interface boards 300 has an identical structure, as so in FIG. 1 the internal structure is shown for only one of the interface boards 300, and the internal structure is omitted for the other interface boards 300. Each of the interface boards 300 includes a TxRx processing block 310 and a plurality of physical interface blocks 320. The TxRx processing block 310 is a custom designed ASIC, as is the case for the packet processing block 120 and the routing control block 130. Each physical interface block 320 is connected to a network via a line 600, where physical interface conversion, such as optical/electrical conversion or electrical level conversion is performed for the packets carried on the lines 600 to convert to data that can be processed within the interface boards. Coaxial line, optical fibers, or the like, can be used for the lines 600.

Here the packet processing block 120 of the aforementioned switching board 100, and the TxRx processing block 310 of the interface board 300 are connected so as to be able to communicate with an external bus 500. Each packet processing block 120 can communicate with each of the TxRx processing blocks 310 in the three interface boards 300.

The structure of the network switching device 100 will be explained in greater detail, referencing FIG. 3, focusing on the switching board 100 and the interface board 300. The switching board 100 includes an on-board power supply (OBP) 160 and clock generators CL1 through CL5, in addition to the packet processing block 120, the routing control block 130, and the internal bus 140, described above. Moreover, the interface board 300 includes an on-board power supply (OBP) 360, and clock generators CL6 and CL7 in addition to the TxRx processing block 310 and the physical interface blocks 320, described above.

The on-board power supply 160 supplies electric power to each of the constituent elements included in the switching board 100, and the on-board power supply 360 supplies electric power to each of the constituent elements included in the interface board 300, and are connected to a main power supply 700.

Each of the clock generators CL1 through CL7 includes a high-frequency oscillator 22, a low-frequency oscillator 23, and a selector 21, as shown for the example of the clock generator CL1 in FIG. 3. The high-frequency oscillator 22 and the low-frequency oscillator 23 use, for example, crystal oscillators, and produce clock signals of specific frequencies. The frequency of the clock signal produced by the high-frequency oscillator 22 is higher than the frequency of the clock signal produced by the low-frequency oscillator 23. In the below, the clock signal generated by the high-frequency clock oscillator 22 shall be termed the high-frequency clock signal HH, and the clock signal generated by the low-frequency oscillator 23 shall be termed the low-frequency clock signal HL. The frequency of the high-frequency clock signal HH is set to, for example, between 1.5 times and 3 times the frequency of the low-frequency clock signal HL. The selector 21 is controlled by the system management block 11 to cause either the high-frequency oscillator 22 or the low-frequency oscillator 23 to produce a clock signal, and then outputs that clock signal. As can be understood from the discussion above, each of the clock generators CL1 through CL7 can be controlled by the system management block 11 to output selectively a clock signal that is either the high-frequency clock signal HH or the low-frequency clock signal HL.

The clock generator CL1 provides a clock signal to the routing control block 130 of the switching board 100, where the routing control block 130 operates synchronized with the supplied clock signal. The clock generator CL2 and the clock generator CL3 supply clock signals to the internal bus 140 that connects the routing control block 130 to the packet processing block 120, and the internal bus 140 operates synchronized with the supplied clocks. The clock generator CL4 supplies a clock signal to the packet processing block 120 of the switching board 100, where the packet processing block 120 operates synchronized with the supplied clock. The clock generator CL5 and the clock generator CL6 supply clock signals to the external bus 500 that connects the packet processing block 120 of the switching board 100 to the TxRx processing block 310 of the interface board 300, where the external bus 500 operates synchronized with the supplied clock. The clock generator CL7 supplies a clock signal to the TxRx processing block 310 of the interface board 300, and the TxRx processing block 310 operates synchronized with the supplied clock circuit.

The structures of the TxRx processing block 310, the packet processing block 120, and the routing control block 130 will be explained in more detail. As is shown in FIG. 3, the TxRx processing block 310 includes a TxRx engine 311 and a memory 312. The packet processing block 120 includes a forwarding engine 121 and a memory 122. The routing control block 130 includes a forwarding destination search engine 131, a memory 132, and a high speed search memory 133. The high speed search memory 133 can use, for example, content-addressable memory (CAM). The memory 132 stores a forwarding table 134. The high speed search memory 133 stores an IP address table 135. The high speed search memory 133 is a memory that is provided with a search function, and can retrieve rapidly the IP addresses stored in the IP address table 135. Note that the forwarding table 134 and the IP address table 135 are distributed by the system management block 11.

A simple explanation of the packet switching process by the network switching device 1000 will be given next. The electronic signals for the data that is transmitted on the lines 600 are converted into bit data by the physical interface blocks 320 (in a process corresponding to the physical layer in the OSI (open system interconnection) reference model). The TxRx engine 311 of the TxRx processing block 310 recognizes the data block used in the data link layer in the OSI reference model by interpreting the bit data. The data block used in the data link layer is termed a "frame," where there are, for example, Ethernet™ frame. The TxRx engine 311 of the TxRx processing block 210 extracts, from the recognized frame, the data block that is used in the network layer and sends the extracted data block through the external bus 500 to the packet processing block 120. The data block used in the network layer is termed a "packet," such as IP packet. Conversely, the structure may be such that the TxRx engine 311 sends the frames, without extracting the packets, with the packets being extracted from the frames in the packet processing block 120. The memory 312 is used as a buffer area for the temporary storage of data such as frames, during processing by the TxRx engine 311. The packet processing block 120, of the plurality of packet processing blocks 120 to which the TxRx engine 311 of the TxRx processing block 310 will send the packet is either set in advance in the TxRx processing block 310 by the system management block 11, or is determined based on the header data of the frame.

The forwarding engine 121 of the packet processing block 120 stores temporarily, in the memory 122, the packets that have been sent from the TxRx engine 311. The forwarding engine 121 extracts the address data that is associated with the packets that have been sent. The address data is, for example, header data that includes an IP address. The forwarding engine 121 sends the extracted address data through the internal bus 140 to the routing control block 130 within the same switching board 100. In this embodiment, the address data is equivalent to the destination-address information in the claims.

The routing control block 130 searches the IP address table 135 that is stored in the high speed search memory 133 using the IP address that has been sent as the address data, as the search key. Because pointers are associated with each IP address stored in the IP address table 135, the routing control block 130 is able to acquire the pointer that is associated with the IP address that is the search key. The routing control block 130 references the forwarding table 134 stored in the memory 132 to acquire the packet processing data that is associated with the pointer. The packet processing data describes that data that specifies the packet forwarding address, or in other words, data that specifies the line that should send the packet. The data that specifies the line is, for example, the number of the TxRx processing block 310 and the number of the physical interface block 320 to which the applicable line is connected.

The routing control block 130 sends the acquired packet processing data through the internal bus 140 to the packet processing block 120. The forwarding engine 121 of the packet processing block 120 specifies, based on the acquired packet processing data, one TxRx processing block 310 to which the packet should be sent, from among the plurality of TxRx processing blocks 310 included in the network switching device 1000. The forwarding engine 121 sends the packet, along with the corresponding packet processing data, through the external bus 500 to the specified TxRx processing block 310. The TxRx processing block 310, upon receipt of the packet and the packet processing data, sends the packet from the physical interface block 320 specified based on the packet processing data. The series of packet switching processes described above are executed for each packet that is sent through the line 600 to the network switching device 1000.

Figure 5:
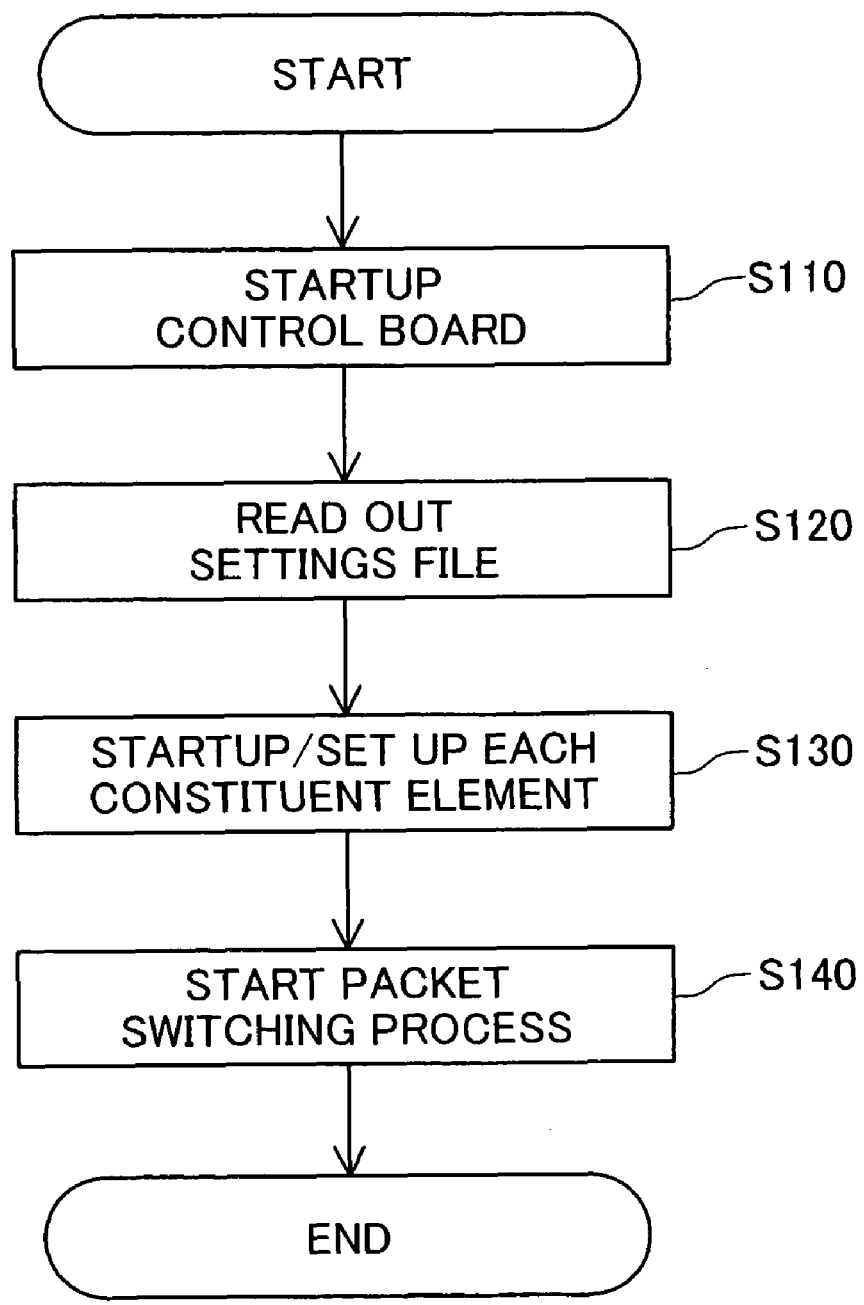
FIG. 5 shows a flowchart of a processing routine in a startup process.

FIG. 4 and FIG. 5 will be referenced next to explain the startup process for the network switching device 1000. FIG. 4 shows an explanatory diagram of one part of the contents of the settings file. FIG. 5 shows a flow chart of the processing routine in the startup process. The startup process is executed when the power supply is turned on or when there is a restart after a problem. When the startup process is initiated, the control board 10 is started up first (Step S110).

When the control board 10 is started up, the system management block 11 of the control board 10 reads out the settings file 17 that is stored in the memory 13 (Step S120). The settings file 17 is a file for storing the various types of setup information for the user to setup the network switching device 1000. The settings file 17 may, in addition to what is shown in FIG. 4, include line information such as the types of lines, definitions of link aggregation functions, routing protocol information such as definitions pertaining to routing protocol, and so forth. FIG. 4 selectively shows that which is necessary to the description of the embodiment, the settings file 17, as shown in FIG. 4, includes running mode specification data that specifies the running mode of the network switching device 1000. The network switching device 1000 pertaining to the embodiment can operate in the following five running modes:
1. Normal power fixed running mode,
2. Low-power fixed running mode,
3. Traffic load basis running mode,
4. Periodic basis running mode, and
5. Line speed basis running mode.

Moreover, the settings file 17 may include, as settings pertaining to the traffic load basis running mode, specifications of ranges of traffic and specifications of operation modes corresponding to the ranges of traffic. The settings file 17 may include, as settings pertaining to the periodic basis running mode, specifications of time bands and specification of operation modes corresponding to the time bands. Moreover, the settings file 17 may include, as settings pertaining to the line speed basis running mode, specifications of line speed ranges and specifications of operation modes corresponding to the line speed ranges. These running modes will be described below.

The settings file 17 can include as well non-use record information. Non-use record information includes information on "unused interfaces, and data on unused boards. The non-use record information is information for recording in advance unused interface boards and unused physical interface blocks. The non-use record information is information for specifying the unused interface boards when there are interface boards that are not used ("unused interface boards") among the plurality of interface boards 300, and may use, for example, the identification number of the interface board 300 (which, in the example shown in FIG. 4, is "#3"). Moreover, the non-use record information is information for specifying the unused physical interface blocks when there are physical interface block that are not used ("unused physical interface blocks") among the plurality of physical interface blocks 320, in the respective plurality of interface boards 300, and may use, for example, the identification number of the interface board 300 to which the unused physical interface block belongs, in combination with the identification number of the unused physical interface blocks (which, in the example shown in FIG. 4, are "#2-2" and "#2-2").

When the settings file 17 is read out, the system management block 11 executes the startup/setup of the each constituent elements in the network switching device 1000 based on the data that is recorded in the settings file 17 (Step S130). Here the various constituent elements for which the startup/setup is executed include not just the system management block 11, but also all constituent elements such as the packet processing block 120, the routing control block 130, and the internal bus 140 of the switching board 100, the TxRx processing block 310 of the interface board 300, and the external bus 500.

Explaining in detail, the system management block 11 controls the onboard power supply 160 of the switching board 100 to supply power to the packet processing block 120, the routing control block 130, and the internal bus 140. Similarly, the system management block 11 controls the on-board power supply 360 of the interface board 300 to supply power to the TxRx processing block 310 and the physical interface block 320. Similarly, power is also supplied through the onboard power supply 360 to the external bus 500. Note that the system management block 11 turns off the output from the onboard power supply 360 of the recorded interface board 300 when an interface board 300 is recorded as an unused interface board in the non-use record information in the settings file 17. The result is that the power supply to each of the elements included in the applicable interface board 300 (including the TxRx processing block 310, the physical interface block 320, and the clock generators CL6 and CL7) included in the applicable interface board 300 will be in a stopped state. Similarly, when a unused physical interface block is recorded in the non-use record information in the settings file 17, the system management block 11 either causes the power from the onboard power supply 360 to not be supplied to the physical interface block 320 that is recorded, or make the physical interface block that is recorded in a state in which the power consumption is reduced using an existing technology.

Furthermore, when the normal power fixed running mode is setup in the settings file 17, the system management block 11 controls the various clock generators CL1 through CL7 to produce and output high-frequency clock signals HH. This causes the packet processing block 120, routing control block 130, internal bus 140, external bus 500 and TxRx processing block 310 to each start up synchronized with the high-frequency clock signal HH. Similarly, when any of the three basis running modes (traffic basis, periodic basis, or line speed basis) are set in the settings file 17, the packet processing block 120, routing control block 130, internal bus 140, external bus 500, and TxRx processing block 310 are each started up with default values synchronized with the high-frequency clock signal HH.

On the other hand, if the low-power fixed running mode is set in the settings file 17, the system management block 11 controls the various clock generators CL1 through CL7 to produce and output low-frequency clock signal HL. This causes the packet processing block 120, routing control block 130, internal bus 140, external bus 500, and TxRx processing block 310 to startup synchronized with the clock signal HL. After this, in the operation of the network switching device 100, the operation mode of the respective constituent elements 120, 130, 140, 500, and 310 that are synchronized with the high-frequency clock signal HH shall be termed the "high-frequency clock operation," and the operation mode of the respective constituent elements 120, 130, 140, 500, and 310 that are synchronized with the low-frequency clock signal HL shall be termed the "low-frequency clock operation." As a general concept, speeding up the clock signals, which are a major factor in determining the operating speed of the various constituent elements, is one means by which to enable high speed packet processing; however, speeding up the clock signals makes the amount of power consumption increase due to the increased operating speed of the internal semiconductor integrated circuits. In the network switching device 1000 that uses the various constituent elements using this design method, speeding up the operation clock signals that are supplied to the various constituent elements increases the switching capacity by also increases the power consumption. Conversely, reducing the speed of the clock signal can reduce power consumption, but reduces the switching capacity.

When each constituent element of the network switching device 100 is started up and setup by the switch control block 11 and network switching device 1000 become a state wherein the packet switching process can be operated, then the packet switching process are started in the network switching device 1000 (Step S140), and the startup process is terminated.

Here, as described above, either of the two fixed running modes (the normal power or low-power running mode) or any of the three basis running modes (the traffic basis, periodic basis, or line speed basis running mode) can be set in the settings file 17. The normal power fixed running mode is a running mode where, after running commences, the network switching device 1000 is always running at the high-frequency clock operation, and the low voltage fixed running mode is a running mode wherein, after running commences, the network switching device 1000 is always running at the low-frequency clock operation. On the other hand, the basis running modes are running modes wherein, after running commences, the operation of the network switching device 1000 switches automatically between high-frequency clock operation and low-frequency clock operation depending on the actual traffic load or the forecasted traffic load in the packet switching process.

Figure 6:
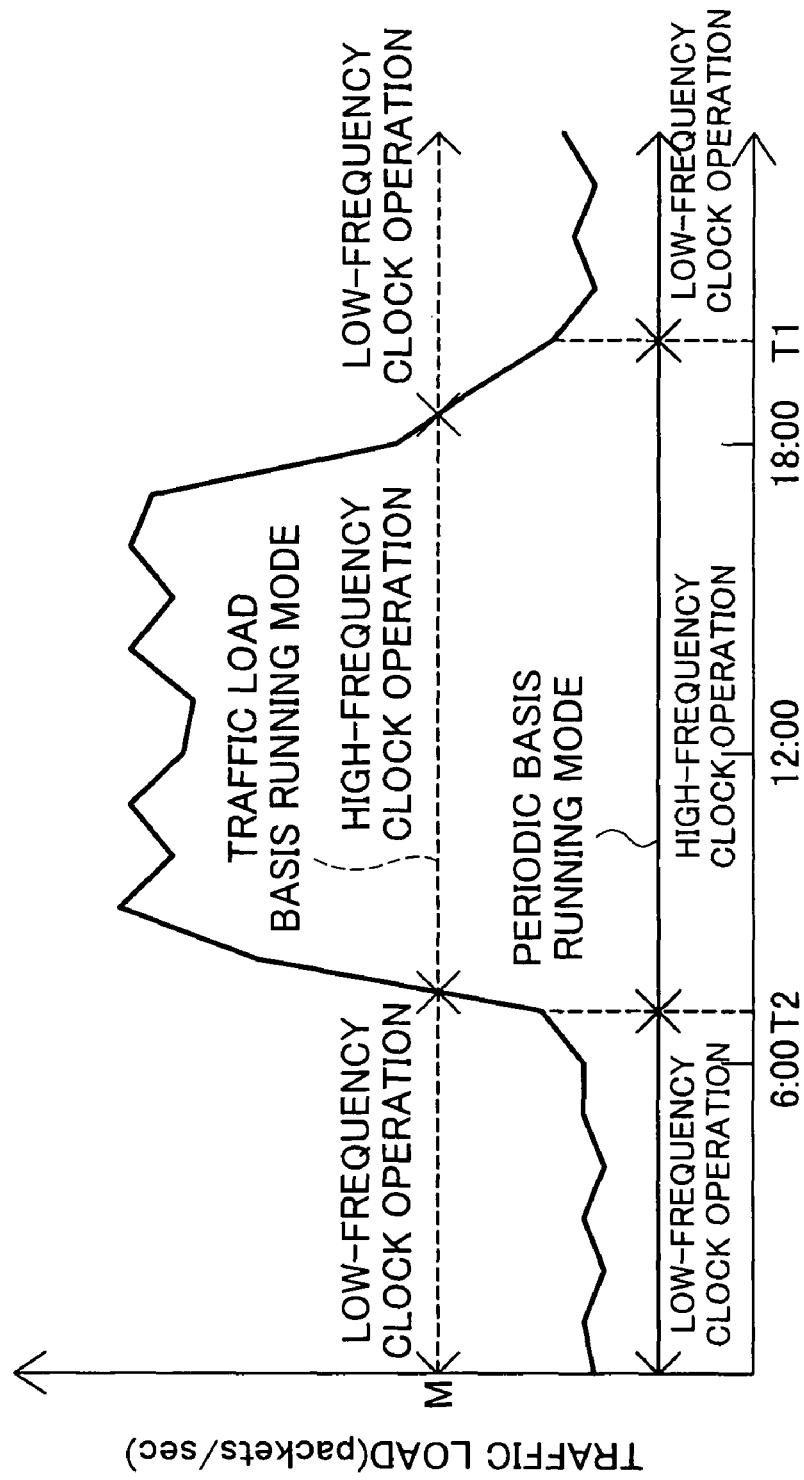
FIG. 6 shows an explanatory diagram for explaining the traffic load basis running mode and the periodic basis running mode.
Figure 7:
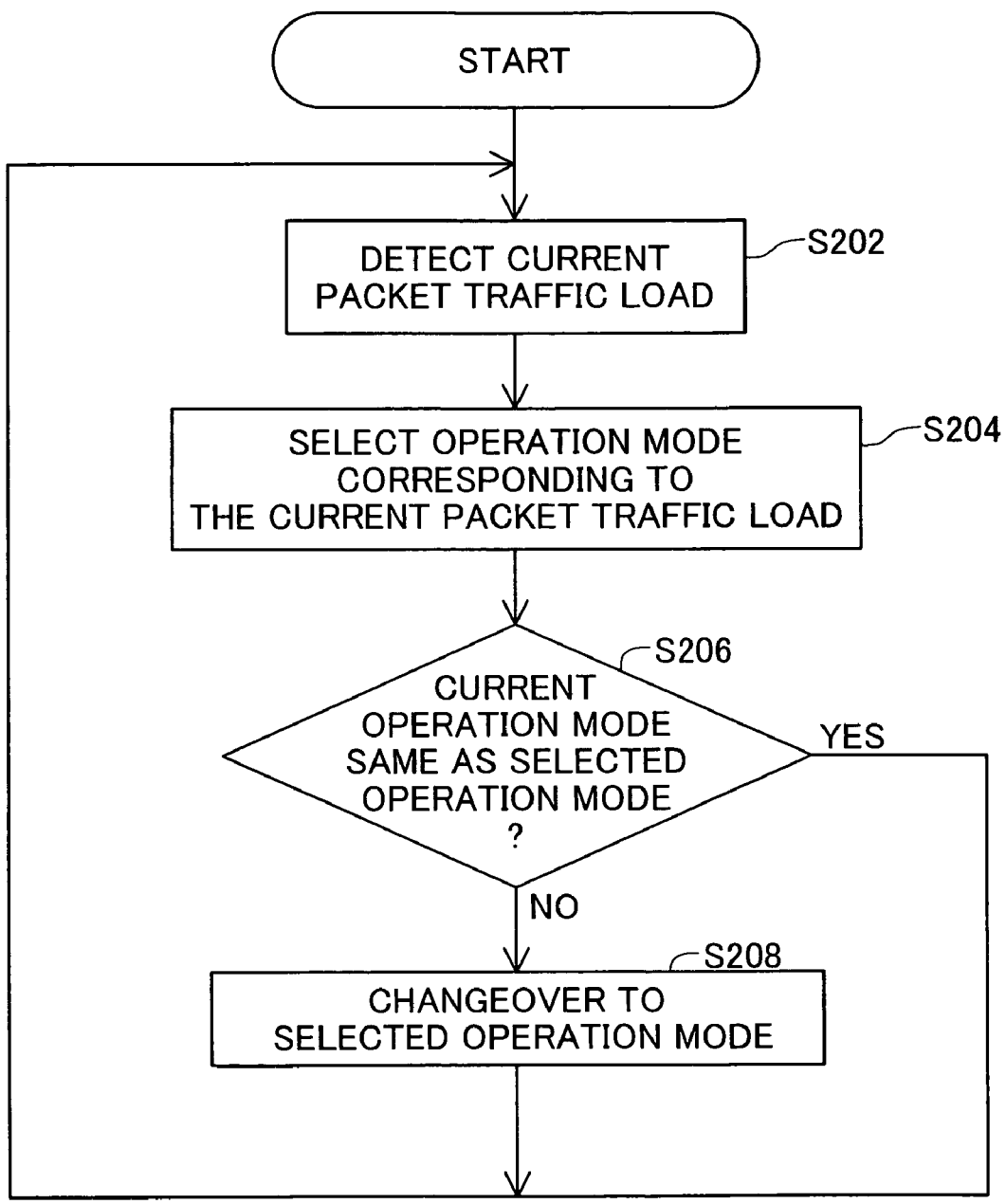
FIG. 7 shows a flowchart of the processing routine in a frequency control process in the traffic load basis running mode.
Figure 8:
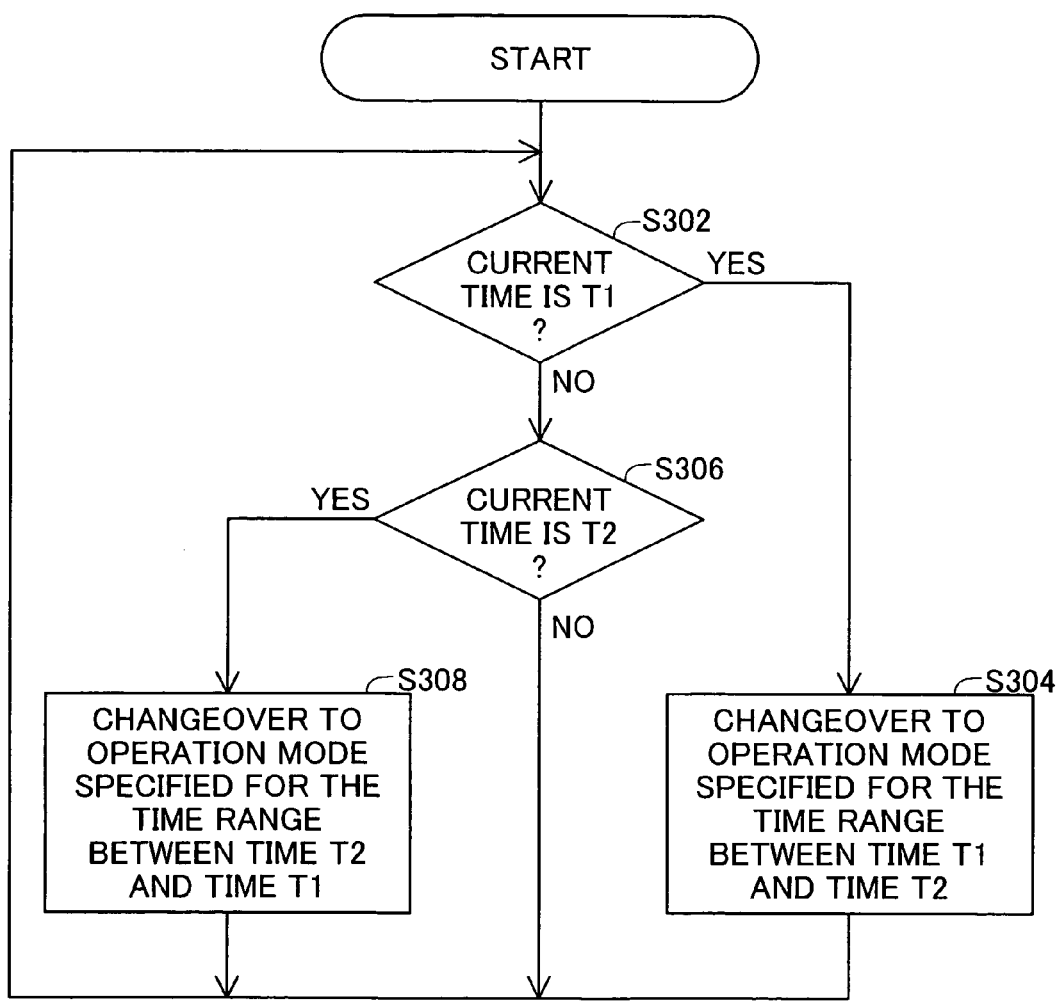
FIG. 8 shows a flowchart of a processing routine in a frequency control process in the periodic basis running mode.

The traffic load basis running mode and the periodic basis running mode will be explained in reference to FIG. 7 through FIG. 8. FIG. 6 shows an explanatory diagram for explaining the traffic load basis running mode and the periodic basis running mode. FIG. 7 shows a flow chart of the processing routine in the frequency control process in the traffic load basis running mode. FIG. 8 shows a flow chart of the processing routine in the frequency control process in the periodic basis running mode. In FIG. 6, the horizontal axis shows the time of day, and the vertical axis shows the traffic (the amount of packet flow) per unit time. The switching capacity required in the network switching device is not necessarily always a high value, but rather often may change with relative regularity depending on the network operating environment. For example, in the example illustrated in FIG. 6, there is a sudden increase in traffic beginning about 7:00 am, with consistently high traffic from 8:00 am to 6:00 pm. However, the traffic rapidly diminishes between 6:00 pm and 8:00 pm, with uniformly low traffic from 8:00 pm through 7:00 am the next day, at about ⅓ of the traffic found between 8:00 am and 6:00 pm.

When this type of change in traffic level is known to repeat regularly, the user may select, for example, the traffic load basis mode. As shown in FIG. 4, in the traffic load basis settings, if the per-unit-time traffic load (packets/sec) of the packets is less than M, then the corresponding operation are set to low-frequency clock operation, and if the per-unit-time traffic load is M or more, then the corresponding operation is set to high-frequency clock operation. The value of M may be set to an intermediate value between the average traffic load between 8:00 am and 6:00 pm and the average traffic load between 8:00 pm and 7:00 am the next morning. The frequency control process when the network switching device 1000 is in traffic load basis mode will be explained below referencing FIG. 7. When running of the network switching device 1000 starts, the traffic check module 15 of the system management block 11 detects the current packet traffic load (Step S202). The value used as the current packet traffic load is, for example, an average packet traffic load over the previous period of time of a specific length (for example, over the previous five minutes). When the current packet traffic load is detected, the frequency control module 16 of the system management block 11 references the traffic load basis settings in the settings file 17 shown in FIG. 4 and selects the operation mode (which is either low-frequency clock operation or high-frequency clock operation in the example shown in FIG. 4) corresponding to the current packet traffic load that has been detected (Step S204). The frequency control module 16 then determines whether or not the current operation mode of the network switching device 1000 is the same as the operation mode selected in Step S204 (Step S206). If the frequency control module 16 determines that the current operation mode is the same as the operation mode selected in Step 204 (Step S206: Yes), then processing returns to the process in Step 202, and the process described above is repeated.

On the other hand, if the frequency control module 16 determines that the current operation mode is not the same as the operation mode selected in Step S204 (Step S206: No), then the frequency control module 16 changes the operation mode of the network switching device 1000 to the operation mode selected in Step S204 (Step S208). As a specific example, with the traffic load basis settings shown in FIG. 4, the case will be described wherein the current packet traffic load is less than M in step S202, so the low-frequency clock operation is selected as the corresponding operation mode in Step S204. In this case, if the network switching device 1000 is already operating at the low-frequency clock operation, then the processing returns to Step 202, and if the network switching device 1000 is operating at high-frequency clock operation, then the operation mode will be switched over from high-frequency clock operation to low-frequency clock operation. The changeover of the operation mode from high-frequency clock operation to low-frequency clock operation is performed through restarting the various constituent elements 120, 130, 140, 500, and 310 to which the clock signals are provided by the clock generators CL1 through CL7, described above, and switching the clock signals generated by these clock generators CL1 through CL7 from high-frequency clock signals HH to low-frequency clock signals HL.

When performing the frequency control process as described above, in a time band wherein the traffic load is high and a large amount of switching capacity is required (from 8:00 am to 6:00 pm in the example in FIG. 6), the network switching device 1000 will operate a high-frequency clock operation. On the other hand, in a time band wherein the traffic load is low and there is not so much of a need for switching capacity (from 10:00 pm to 7:00 am the next morning in the example in FIG. 6), the network switching device 1000 will operate with low-frequency clock operation.

Moreover, with the network environment shown in FIG. 6, the user may select the periodic basis running mode. The frequency control process for running the network switching device 1000 in the periodic basis running mode will be described in reference to FIG. 8. When the operations begin, the frequency control module 16 of the device control unit 11 determines whether or not the current time has reached Time T1 recorded in the settings file 17 (Step S302). If the frequency control module 16 determines that the current time is T1 (Step S302: Yes), then the frequency control module 16 references the settings file 17 to change the operation of the network switching device 1000 to the operation mode defined in the time range from Time T1 through Time T2 (Step S304), and processing return to Step S302. In the example in FIG. 4, the operation mode that is specified for the time range from Time T1 to Time T2 is low-frequency clock operation, so in Step S304, the operation of the network switching device 1000 is changed from high-frequency clock operation to low-frequency clock operation.

If the frequency control module 16 determines that the current time is not T1 (Step S302: No), then the frequency control module 16 determines whether or not the current time is Time T2 written in the settings file 17 (Step S206). If the frequency control module 16 determines that the current time is T2 (Step S306: Yes), then the frequency control module 16 references the settings file 17 to change the operation of the network switching device 1000 to the operation mode specified in the time range from Time T2 through Time T1 (Step S308), and processing returns to Step S302. In the example illustrated in FIG. 4, the operation mode specified in the time range from Time T2 through Time T1 is high-frequency clock operation, and so in Step S308, the operation of the network switching device 1000 is switched over from low-frequency clock operation to high-frequency clock operation. If the frequency control module determines that the current time is not time T2 (Step S306: No), then processing returns to Step S302.

When the frequency control process is performed as described above, then, as shown in FIG. 6, the network switching device 1000 is operated at high-frequency clock operation during the time band wherein high switching capacity is required, and operates with low-frequency clock operation during the time band wherein such high switching capacity is not required, in the same way as for the traffic load basis running mode described above.

Figure 9:
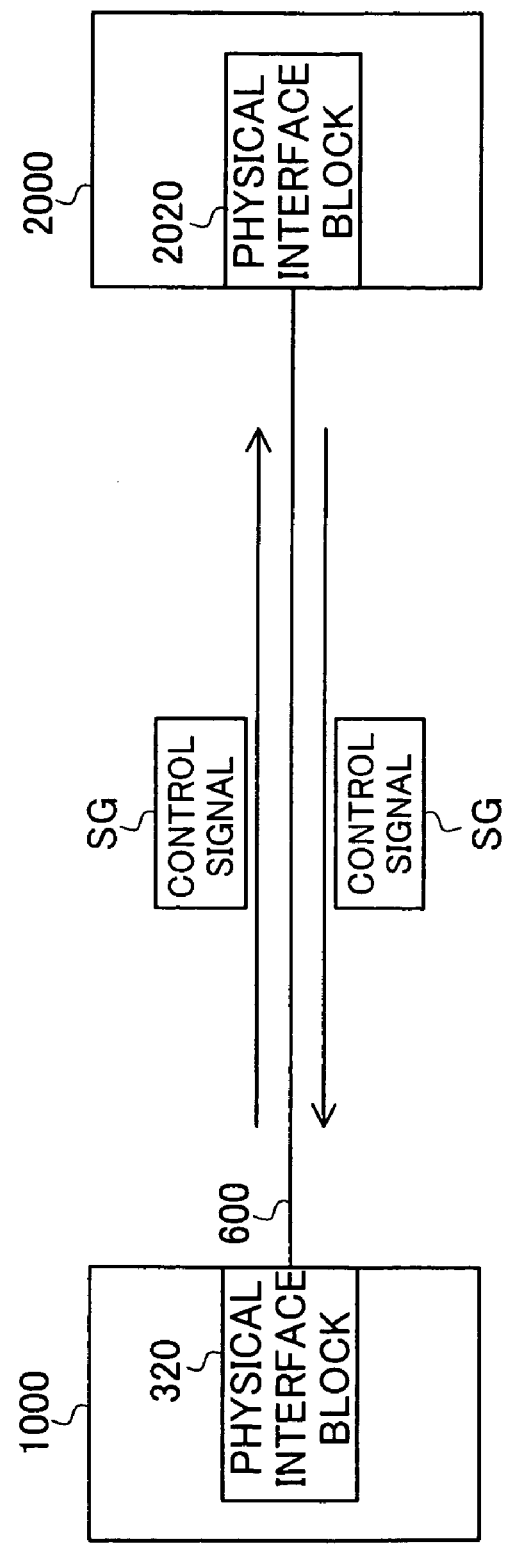
FIG. 9 shows a figure for explaining an auto negotiation function that automatically coordinates the line speeds/communications modes of a line between a pair of mutually connected devices.
Figure 10:
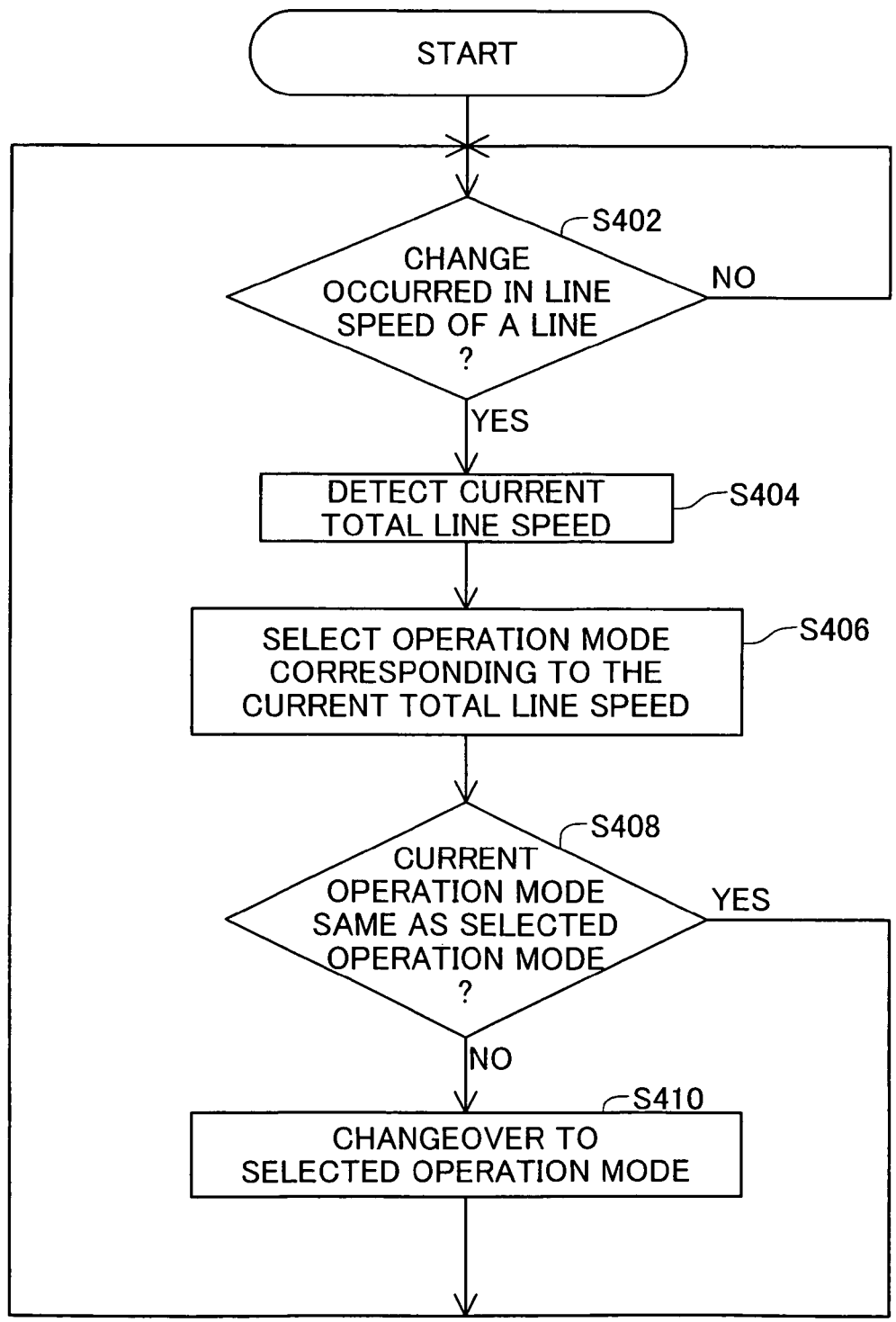
FIG. 10 shows a flowchart of a processing routine in a frequency control process in the line speed basis running mode.

Next FIG. 9 and FIG. 10 will be referenced in describing the line speed basis running mode. FIG. 9 shows a figure for explaining an auto negotiation function that automatically coordinates the line speeds/communications modes of a line between a pair of mutually-connected devices. FIG. 10 shows a flowchart of the processing routine in the frequency control process in the line speed basis running mode. The auto negotiation function is a function that coordinates automatically the line speeds/communications modes of a line between mutually-connected devices. In a communications method established by IEEE (the American Institute of Electrical and Electronics Engineers), there are interfaces having auto negotiation functions. Typical communications methods having auto negotiation include 10 BASE-T/100 BASE-X (specified in IEEE 802.3u), 1000 BASE-T (specified in IEEE 802.3ab), and 1000 BASE-X (specified in IEEE 802.3z). If the physical interface block 320 of the network switching device 1000 supports these communications methods, then, as shown in FIG. 9, when mutually connected with the physical interface block 2020 of an opposite device 2000 through a line 600, the physical interface block 320 is able to automatically adjust the line speeds/communications mode through checking the communications capabilities between the physical interface block 320 and the physical interface block 2020 of the opposite device 2000, connected through the line 600. Specifically, the mutual communications capability is confirmed through the exchange of control signals SG for communicating transfer capability data between the devices. Given this, the line speed/communications mode with the highest priority, of those modes supported by both devices, is set automatically. The line speed/communications mode can also be set manually. When the physical interface block 320 is provided with an auto negotiation function, then the packet traffic coming into the network switching device 1000 is determined by the line speed set in each of the physical interface blocks 320. For example, in a network switching device 1000 wherein ten lines 600 are connected, if the line speed in all of the lines 600 is set to 10 Mbps, then all of the packets can be processed if the network switching device 1000 has a switching capacity of 10 Mbps×10 lines=100 Mbps. Moreover, if the line speed for all of the lines 600 is 1000 Mbps, then it would be necessary for the network switching device 1000 to have a switching capacity of 1000 Mbps×10 lines=10 Gbps.

In this way, the switching capacity required in the network switching device 1000, depending on the results of the line speed negotiations by the physical interface blocks 320, will not necessarily always be the higher value. When the user selects the line speed basis running mode, then the user sets the line speed ranges and the corresponding operation modes in the setting file in consideration of the switching capacity that can be provided by the operation mode. In the example illustrated in FIG. 4, the operation mode corresponding to the case wherein the sum of the line speeds of all of the lines 600 (hereinafter termed the total line speed) is less than N is set to the low-frequency clock operation, but the operation mode corresponding to the case wherein the total line speed is N or greater is set to high-frequency clock operation.

The frequency control process when running the network switching device 1000 in the line speed basis running mode will be explained in reference to FIG. 10. When running of network switching device 1000 starts, the line speed check module 18 of the system management block 11 obtains the current line speeds of each of the lines 600 and determines whether or not there has been a change in the total line speed (Step 402). For example, if a new line 600 has been connected, then there will have been a change in the total line speed. When the line speed check module 18 determines that there has been no change in the total line speed (Step S402: No), then monitoring for the occurrence of a change in the total line speed is continued. If the line speed check module 18 determines that a change in the total line speed has occurred (Step S402: Yes), then the sum of the line speed of all of the lines 600 (the total line speed) is calculated/detected (Step S404). The frequency control module 16 of the system management block 11 references the settings file 17 to select the operation mode corresponding to the total line speed that has been detected (Step S406). The frequency control module 16 determines whether or not the current operation mode of the network switching device 1000 is the same as the operation mode selected in Step S406 (Step S408).

When the frequency control module 16 determines that the current operation mode is the same as the operation mode selected in Step S406 (Step S408: Yes), then processing returns to Step S402, and the processes described above are repeated. On the other hand, when the frequency control module 16 determines that the current operation mode is not the same as the operation mode selected in Step S406 (Step S408: No), then the operation mode of the network switching device 1000 is switched over to the operation mode selected in Step S406 (Step S410). As a specific example, an explanation will be given of the case wherein, with the line speed basis setting as shown in FIG. 4, the current total line speed in Step S404 is less than N, and low-frequency clock operation has been selected as the corresponding operation mode in Step S406. In this case, if the network switching device 1000 is already operating in the low-frequency clock operation, then processing returns to Step S402, but if the network switching device 1000 is operating in high-frequency clock operation, then the operation mode is switched from high-frequency clock operation to low-frequency clock operation. The switching of the operation mode is performed in the same manner as the switching of the operation mode for the traffic load basis mode described above.

When the frequency control process, described above, is performed, the network switching device 1000 operates with high-frequency clock operation when the sum of line speeds is high so that the state of network switching device 1000 is one wherein the high packet traffic load can be anticipated. On the other hand, when the sum of the line speeds is low, in a state wherein such high switching capacity will not be required, then the network switching device 1000 operates with low-frequency clock operation.

As can be understood from the description above, in the embodiment, the frequency control module 16 switches the operation mode of the network switching device 1000 by changing the frequency of the clock signal that is generated. That is, in this embodiment, the frequency control module 16 equivalent to the mode management block in the claims.

The network switching device 1000 in the embodiment, described above, change the frequency of the clock signal supplied to the various constituent elements depending on the user settings. This makes it possible to increase the performance of the network switching device 1000 by increasing the processing speed of the semiconductor integrated circuits (for example, the packet processing blocks 120 and the routing control blocks 130) by increasing the frequency, and makes it possible to reduce the power consumption of the network switching device 1000 by reducing the processing speed of the semiconductor integrated circuits by reducing the frequency. The result is that it is possible to control the amount of electrical power consumed by the network switching device 1000 while maintaining the necessary performance when required.

Moreover, because switching between high-frequency clock operation and low-frequency clock operation is performed automatically depending on the traffic load, such as in the periodic basis running mode, the traffic load basis running mode, and the line speed basis running mode, it is not only possible to maintain a large switching capacity when a large switching capacity is required, but also possible to reduce the consumption of electric power when a large switching capacity is not required. The result is the ability to control the overall consumption of electric power without sacrificing switching performance.

Moreover, the user is able to record, in advance, in the settings file 17, the interface boards 300 that will not be used. At startup, the system management block 11 references the settings file 17 regarding the unused interface boards 300 that have been recorded in the settings file 17, to selectively stop the supply of power thereto. The result is that it is possible to further reduce the amount of electrical power consumed.

Moreover, the user is able to record, in advance, in the settings file 17, the physical interface blocks 320 that are unused. If there is an unused physical interface block 320 recorded in the settings file 17, then the system management block 11 does not supply electrical power from the on-board power supply 360 to the physical interface block 320 that is recorded in the settings file 17, or uses a known technology to set a state of the physical interface block 320 that is recorded in the settings file 17 wherein power consumption is reduced. The result is an even greater ability to reduce the consumption of electrical power.

B. Variations

The hardware structure of the network switching device 1000 in the embodiment is merely one example, and the present invention is not limited thereto. The following illustrates examples of other hardware structures as a first variation and as a second variation.

First Variation

Figure 11:
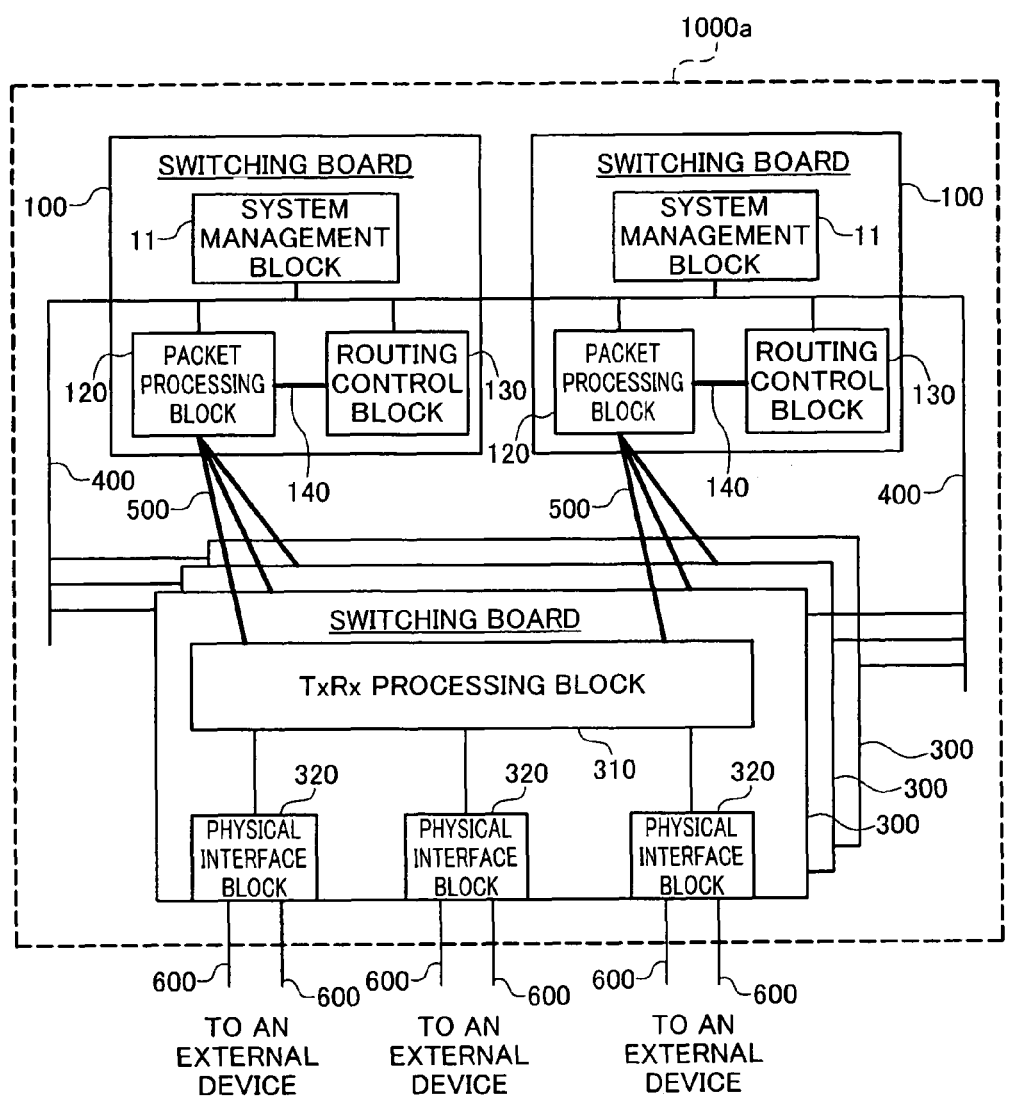
FIG. 11 shows a block diagram of the structure of a network switching device pertaining to a first variation.

FIG. 11 shows a block diagram of the structure of a network switching device 1000a pertaining to a first variation. While in the network switching device 1000 in the embodiment described above, the control board 10 and the switching board 100 are separate, in the network switching device 1000a pertaining to the first variation, there is no control board 10, but rather a system management block 11 is provided in a switching board 100. The functions of the other structures and components are the same as in the embodiment, and so the same codes as in FIG. 1 are used in FIG. 11 as well, and explanations thereof are omitted. Even in the network switching device 1000a pertaining to the first variation it is possible to obtain the same operation and effects as in the embodiment. Moreover, although a figure is omitted, one board may include the constituent elements of the switching board 100 in FIG. 11 and the constituent elements of the interface board 300 in FIG. 11.

Second Variation

Figure 12:
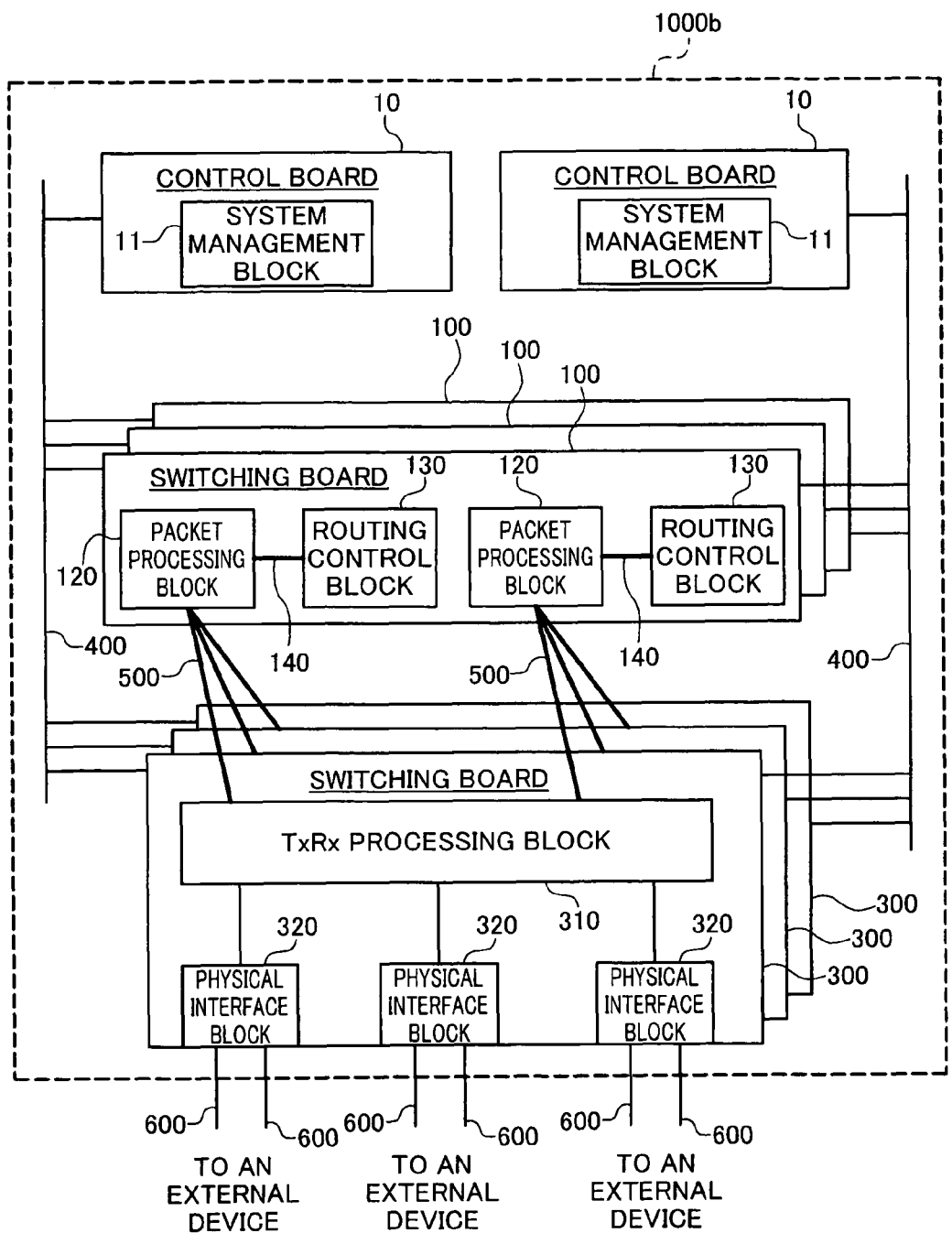
FIG. 12 shows a block diagram of the structure of a network switching device pertaining to a second variation.

FIG. 12 shows a block diagram of the structure of a network switching device 1000b pertaining to a second variation. While in the network switching device pertaining to the embodiment described above, there were two switching boards 100, in the network switching device 1000b pertaining to the second variation, three switching boards 100 are provided. Of the three switching boards 100, two are active boards that perform the packet switching process under normal conditions, and the remaining switching board 100 is a standby board that performs the switch packet processing instead of the active board when failures occur in one of the active boards. In other words, one switching board 100 is a redundant switching board 100.

Here, under normal conditions, that is, during the period of time wherein the standby board is not used for the packets switching process, the system management block 11 prevents a supply of the clock signal to the various structure elements (the packet processing block 120, the routing control block 130, the internal bus 140, and so forth) of the standby board 100. Doing so, overall consumption of electric power by the network switching device 1000 is reduced. Note that when there is a failure in one active board, the provision of the clock signal to each of the constituent elements in the standby board is restarted, where the settings of the another active board wherein no problem has occurred, for example, the content of the forwarding table 134, the content of the IP address table 135 are copied to the standby board through the control bus 400. This makes it possible to swap the standby board 100 with the one active board quickly when a problem occurs. Note that preferably in the standby board, only the control circuit of the control bus 400 for the control board 10 to communicate with the standby board 100 should be supplied the clock signal and be in a state capable of performing communications, in order to perform the swapping without problems. Moreover, when it comes to communications through the control bus 400, preferably the process of confirming that communications are performed normally is performed at regular periods during normal operations.

The network switching device 1000 in the embodiment described above includes two switching boards; however, the network switching device 1000b in the second variation includes three switching boards 100, as shown in FIG. 12. It is possible to increase the switching capacity by having two of the three switching boards 100 operate in parallel as active boards to perform the packet switching processes. One of the switching boards 100 is used as standby board if a failure occurs in either of the two switching boards 100 as active boards.

If there is no need for a large switching capacity in the network switching device 1000b in the second variation (for example, between 8:00 pm and 7:00 am the next morning in FIG. 6), then the device control unit 11 makes the active board into only a single switching board 100, and makes the other two switching boards 100 into standby boards. In this case, the provision of the clock signal to the various constituent elements in the standby boards may be halted. Doing so reduces the overall switching capacity of the network switching device 1000*b* because the single active board performs the packet switching processes, but this makes it possible to reduce the consumption of electrical power. The switching of active and standby may be performed dynamically based on monitoring of the traffic load in the network switching device 1000*b* as a whole. For example, if the traffic load is above a specific threshold, then two switching boards 100 are caused to perform processes as the active board, but when the traffic load is less than a specific threshold value, then a single switching board 100 is caused to perform processes as the active board. Doing this makes it possible to both maintain a large switching capacity when the switching capacity is required, and to reduce the electrical power consumption when the switching capacity is not required.

The switching board 100 in the embodiment described above are provided with a single set of a packet processing block 120, a routing control block 130, and an internal bus 140 (hereinafter termed the "switching processing set"), but in the second variation the switching board 100 is provided with two switching processing sets, as shown in FIG. 12. The switching capacity can be increased by performing the packet switching using the two switching processing sets in parallel.

In the network switching device 1000*b* pertaining to the second variation, the system management block 11 may stop the provision of the clock signal to a single switching processing set when there is no need for a particularly large switching capacity (for example, between 8:00 pm and 7:00 am the next morning in FIG. 6). Doing so causes the remaining one switching processing set to perform the packet switching process by itself, reducing the switching capacity of the device as a whole, but making it possible to reduce the electric power consumption. Switching between stopping and supplying the clock signal in this way may be performed dynamically based on monitoring of the traffic load in the network switching device 1000 as a whole. For example, if the traffic load is above a specific threshold, then two switching processing sets are caused to perform the packet switching, but when the traffic load is less than a specific threshold value, then a single switching processing set is caused to perform the packet switching. Doing this makes it possible to both maintain a large switching capacity when the switching capacity is required, and to reduce the electrical power consumption when the switching capacity is not required.

Third Variation

Although in the embodiment described above clock signals of two different frequencies were generated through the provision of two frequency oscillators 22 and 23 in the clock generators CL1 through CL7, the type of generating the clock signals is not limited there to. For example, the clock generators may be provided with a single frequency oscillator and a frequency multiplier circuit that multiplies the clock signal by a specific multiplication ratio. Note that the frequency multiplier circuit may be provided within the elements to which the clock signals are applied (such as the packet processing block 120). Note that the control of the frequency multiplier circuit by the system management block 11 may be performed through the transmission of a high or low control signal to the frequency multiplier circuit via a signal line, and may be performed through writing a flag to a control register for the frequency multiplier circuit.

Fourth Variation

Although in the embodiment described above, the operation modes in the network switching device 1000 were controlled at the two levels of high-frequency clock operation versus low-frequency clock operation, control may be performed instead with multilevel operation modes. Specifically, the structure may be one wherein all or part of the clock generators CL1 through CL7 may be structured so as to be able to generate three or more different frequencies, where the frequencies of the clock signals that cause the network switching device 1000 to operate may be changed to multiple levels depending on the traffic or depending on a user setting. Conversely, multilevel operation modes may be performed through changing a portion of the clock generators CL1 through CL7 stepwise, rather than changing the clock generators CL1 through CL7 simultaneously. Specifically, the state wherein all of the clock generators CL1 through CL7 generate the high-frequency clock signal HH can be defined as a first operation mode. The state wherein the clock generators CL1 through CL4, which provide the clock signals to the packet processing block 120, the routing control block 130, and the internal bus 140, are caused to generate the low-frequency clock signal HL, and clock generators CL5 through CL7, which provide clock signals to the external bus 500 and the TxRx processing block 310 are caused to generate the high-frequency clock signal HH may be defined as a second operation mode. The state wherein all of the clock generators CL1 through CL7 are caused to generate the low-frequency clock signal HL may be defined as a third operation mode. Moreover, the network switching device 1000 may be operated through selecting any of the first through third operation modes depending on the traffic load or on a user setting. Here it is possible to change flexibly the balance between the processing performance and the power consumption in the network switching device 1000 through being able to change independently the clock signals that are provided to the switching board 100, the interface board 300, and the external bus 500.

Other Variations

A portion of the structure that is achieved in hardware in the embodiment described above may be achieved in software instead, or, conversely, a portion of the structure that is achieved in software in the embodiment described above may be achieved in hardware instead. For example, in the examples of embodiment described above, the packet processing block 120 and the routing control block 130 are structured from an ASIC, but instead may be structured from a general-use processor and a program.

While the present invention have been shown and described on the basis of the embodiments and variations, the embodiments of the invention described herein are merely intended to facilitate understanding of the invention, and implies no limitation thereof Various modifications and improvements of the invention are possible without departing from the spirit and scope thereof as recited in the appended claims, and these will naturally be included as equivalents in the invention.

What is claimed is:

1. A network switching device comprising:
    at least one interface block, connected respectively to at least one line, that receives packets with associated destination-address information and sends packets to a forwarding destination, wherein the at least one interface block is adapted to change operation to operation modes with different levels of power consumption;
    at least one switching block that determines the forwarding destination of a received packet based on the destination-address information of the received packet, wherein the at least one switching block is adapted to change operation to operation modes with different levels of power consumption;

a mode management block that manages the operation modes of the at least one interface block and the operation modes of the at least one switching block independently; and wherein the at least one switching block includes:

at least one first clock generator that generates a plurality of selectable first clock signals having different frequencies; and at least one constituent circuit that operates synchronized with a selected first clock signal of the first clock signals, and wherein the mode management block controls operation of the at least one first clock generator to select a first clock signal of the first clock signals, to change the operation mode of the at least one switching block.

2. A network switching device according to claim 1, wherein the at least one switching block comprises:
   at least one second clock generator that generates plurality of selectable second clock signals having different frequencies;
   a plurality of constituent circuits, which includes the at least one constituent circuit; and
   a first bus for sending data between each of the constituent circuits, the first bus operating synchronized with a selected second clock signal of the second clock signals,
and wherein the mode management block further controls operation of the at least one second clock generator to select a second clock signal of the second clock signals, to change the operation mode of the at least one switching block.

3. A network switching device according to claim 2, wherein one or more of the plurality of the constituent circuits includes: a packet processing block that performs transmission and reception of data, including the received packet, to and from the at least one interface block; and a routing control block that determines the forwarding destination for the received packet, transmitted from the packet processing block,
wherein the first bus is a bus for sending data between the packet processing block and the routing control block,
and wherein the mode management block controls selection of: a first clock signal of the first clock signals, generated for the packet processing block; a first clock signal of the first clock signals, generated for the routing control block; and a second clock signal of the second clock signals, generated for the bus sending data between the packet processing block and the routing control block.

4. A network switching device according to claim 1, further comprising:
   at least one third clock generator that generates a plurality of selectable third clock signals having different frequencies; and
   a second bus for sending data between the at least one interface block and the at least one switching block, the second bus operating synchronized with a selected third clock signal of the third clock signals,
   wherein the mode management block further controls operation of the at least one third clock generator to select a third clock signal of the third clock signals, to change the operation mode of the second bus.

5. A network switching device according to claim 1, wherein
the at least one interface block comprises:
   at least one fourth clock generator that generates a plurality of selectable fourth clock signals having different frequencies; and
   at least one TxRx processing block that operates synchronized with a selected fourth clock signal of the fourth clock signals, the at least one TxRx processing block forwarding the received packet, transmitted from the at least one line, to the at least one switching block, the at least one TxRx processing block directing the received packet back from the at least one switching block onto the at least one line,
wherein the mode management block further controls operation of the at least one fourth clock generator to select a fourth clock signal of the fourth clock signals, to change the operation mode of the at least one interface block.

6. A network switching device according to claim 1, wherein the network switching device is switchable to run with any running mode of multiple types of running modes, through changing some or all of the operation modes of the at least one interface block and the at least one switching block,
and wherein the running mode is switched depending on a traffic load in the network switching device.

7. A network switching device according to claim 6, further comprising
a packet traffic detector that detects packet traffic that is received or sent by the network switching device,
wherein the running mode is switched in accordance with the packet traffic detected.

8. A network switching device according to claim 6, further comprising
a memory that stores time information pertaining to a time band wherein the traffic load is high and pertaining to a time band wherein the traffic load is low,
wherein the running mode is switched by referencing the time information.

9. A network switching device according to claim 6, further comprising
a line speed detector that detects a line speed of the at least one line,
wherein the running mode is switched depending on the line speed detected.

10. A network switching device according to claim 1, comprising a plurality of interface blocks, which includes the at least one interface block,
wherein of the plurality of the interface blocks, an interface block that is not operating is recorded in advance,
and wherein power that is supplied to the interface block recorded is reduced or stopped.

11. A network switching device according to claim 1, wherein the at least one interface block includes a plurality of physical interface blocks that respectively connects to a line of the at least one line,
wherein of the at least one line, an inoperative line that is not operating is recorded in advance,
and wherein power that is applied to a physical interface block, of the plurality of physical interface blocks, that connects to the inoperative line recorded, is reduced or stopped.

12. A network switching device according to claim 1, comprising a plurality of switching blocks, which includes the at least one switching block,
wherein at least one of the plurality of the switching blocks is a redundant switching block used when a failure occurs in another switching block of the plurality of the switching blocks, and wherein during a period of time wherein the redundant switching block is not used, at least a portion of any clock signals being provided to the redundant switching block, is stopped.

13. A network switching device according to claim 1, wherein the at least one switching block includes a plurality of constituent circuits, which includes the at least one constituent circuit, the plurality of constituent circuits having an identical function, and wherein in response to a traffic load on the network switching device, supply of any clock signals being provided to at least a portion of the plurality of constituent circuits, is stopped.

14. A network switching device according to claim 1, comprising a plurality of switching blocks, which includes the at least one switching block, wherein the plurality of the switching blocks are capable of executing process regarding the received packets independently, and wherein in response to a traffic load in the network switching device, supply of any clock signal being provided to at least a portion of the plurality of switching blocks, is stopped.

15. A network switching device connected to a plurality of lines, the network switching device comprising:

a packet switching means for receiving packets sent from any of the plurality of lines, for determining forwarding destinations for the received packets, and for forwarding the received packets; and a clock signal providing means for providing a clock signal to the packet switching means, wherein the clock signal providing means switches a frequency of at least a portion of the clock signal provided to the packet switching means to multiple different values, wherein the packet switching means operates in synchronization with the clock signal provided by the clock signal providing means, a packet traffic load detecting means for detecting a traffic load of the packets that are received or sent using the packet switching means, wherein the clock signal providing means changes, depending on the traffic load, the frequency of at least a portion of the clock signal being provided to the packet switching means.

16. A network switching device according to claim 15, wherein the packet switching means include a first circuit and a second circuit that perform at least a portion of functions of the packet switching means, and forwarding means for forwarding data between the first circuit and the second circuit, and wherein the clock signal providing means controls selection of: a frequency of any clock signal being provided to the first circuit; a frequency of any clock signal being provided to the second circuit; and a frequency of any clock signal being provided to the forwarding means.

17. A network switching device according to claim 15, further comprising a memory means for storing time information related to a time band wherein the traffic load is high and a time band wherein the traffic load is low, wherein the clock signal providing means references the time information to change the frequency of at least a portion of the clock signal for being provided to the packet switching means.

18. A network switching device according to claim 15, further comprising a line speed detecting means for detecting line speed of the plurality of lines, wherein the clock signal providing means changes the frequency of at least a portion of the clock signal for being provided to the packet switching means, depending on the line speed detected.

* * * * *